United States Patent Office 3,326,336
Patented June 20, 1967

3,326,336
AUTOMATIC SLACK ADJUSTERS FOR BRAKES
Woldimar Sobol and Horatio Leslie Higgins, London, England, assignors to Westinghouse Brake and Signal Company Limited, London, England
Continuation of application Ser. No. 338,715, Jan. 20, 1964. This application Jan. 24, 1966, Ser. No. 528,692
52 Claims. (Cl. 188—202)

This application is a continuation of application Ser. No. 338,715, filed Jan. 20, 1964, now abandoned.

This invention relates to slack adjusters and more particularly, to automatic slack adjusters, that is to say, slack adjusters which effect slack adjustment as may be required upon operation of the brakes in the rigging of which the slack adjusters are arranged. The invention moreover, is particularly, although not exclusively applicable to what is known as "double-acting" slack adjusters. Double-acting slack adjusters are ones by which not only can slack be reduced but also by which slack can be increased.

The present invention provides an automatic slack adjuster comprising first and second members movable telescopically relative to each other to effect slack adjustment, the first member having a screw-threaded portion threadedly engaged by first and second nuts, displacement of which on the screw-threaded portion effects relative telescoping of the two members, a sensing member located axially on the second member and mounted for movement therewith towards a stop, a strong spring compressible only by a force of the magnitude transmitted, in operation of the slack adjuster, through the slack adjuster during actual braking compression of the strong spring before the sensing member engages the stop permitting the axial displacement by spinning of the two nuts on the first member to "pay out" the members relative one to the other by axial movement of the second member only for as long as the sensing member does not engage the stop.

There may be provided in a slack adjuster means which in operation of the slack adjuster, preserves the relative positions of the two nuts on the screw-threaded portion of the first member when the brake rigging stretches during a brake application. This means may be brought into operation by the strong spring being compressed when the sensing member engages the stop.

The strong spring may urge into engagement two clutch faces engagement of which prevents the two nuts from spinning, the two faces being separable upon compression of the strong spring to permit the axial displacement of the two nuts. One of the clutch faces may be provided on a part abutted by one end of the strong spring and the other of the clutch faces may be effectively provided on the second member. Said other of the clutch faces may be provided on a sleeve secured to the second member or, alternatively, said other of the clutch faces may be provided on a bush axially located on the second member by abutment of the bush by the other end of the strong spring, the bush having a clutch face engageable with a corresponding clutch face on the second nut whereby engagement of these two clutch faces prevents relative rotation of the second nut and the bush.

Embodiments of the present invention will now be described in greater detail, by way of example only, with reference to the accompanying drawings of which:

FIG. 6 shows a transverse cross-sectional view of another of the clutches used in the slack adjusters of FIGS. 1 and 5.

Throughout the following description like reference numerals will be used to denote like parts.

Also throughout the following description, the terms "right" and "left" and "right-" and "left-hand" are to be understood as meaning "as viewed in the drawings."

Figure 1:
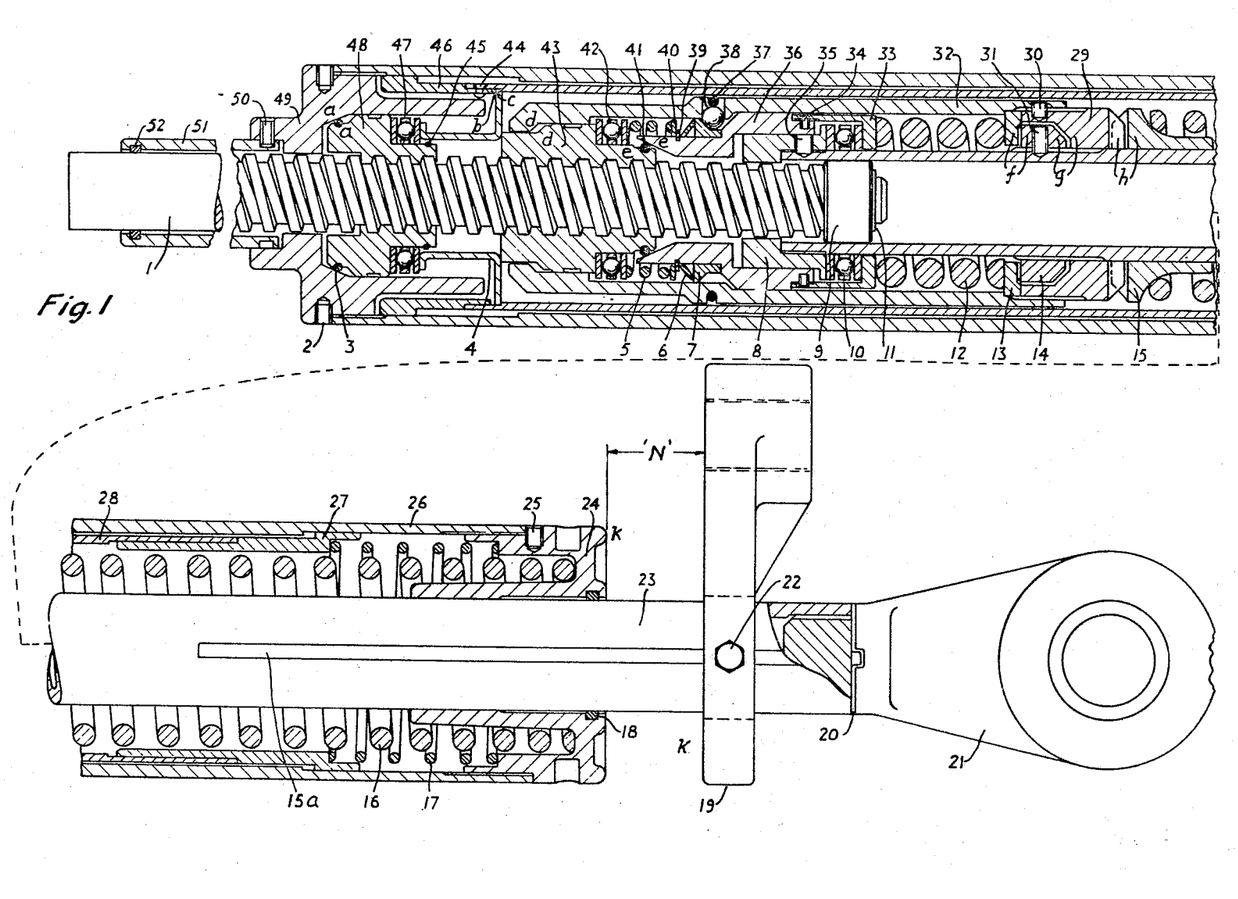
FIG. 1 shows a longitudinal cross-sectional view of one form of an automatic double-acting slack adjuster.

The components of the slack adjuster shown in FIG. 1 can be generally divided into the following main groups of components:

(1) First and second members moveable telescopically relative to each other to effect slack adjustments.

(2) A pair of nuts displacement of which on the one of the members effects telescoping of the members.

(3) First means for detecting any abnormal brake clearance and for correcting such abnormality.

(4) Second means for preserving the relative position of the nuts during rigging stretch and thereby obviating unwanted action by the slack adjuster.

THE FIRST AND SECOND MEMBERS

These comprise, as the first member, a spindle 1 provided on its right-hand end with a screw-threaded portion and, as the second member, a tubular pull-rod 23. The spindle 1 and the pull rod 23 are relatively telescopic, the spindle 1 being guided within the pull-rod 23 by the internal face of an annular collar 8 screwed on to the left-hand extremity of the pull-rod 23 and secured by a pin 35, the internal face providing a bearing for the screw-threaded portion of the spindle 1. The spindle 1 is prevented from being completely withdrawn from the pull-rod 23 by a stop bush 9 secured to the right-hand end of the spindle 1, the diameter of the stop bush 9 being slightly greater than the diameter of the internal face of the collar 8. It will be seen that this stop bush 9 will also assist in maintaining alignment of the spindle 1 and the pull-rod 23 during telescoping.

The pull-rod 23 carries a load transmitting ring 14 which is screwed on to the pull-rod 23 and secured thereon by a set-screw 31.

To the right-hand end of the pull-rod 23 is secured a cross-head 21 which is screwed into the end of the pull-rod 23 and is secured in position by a lock washer 20. The cross-head 21 provides the means whereby the pull-rod 23 can be coupled into the brake rigging. A similar cross-head (not shown) is secured to the left-hand end of the spindle 1 for the same purpose.

THE PAIR OF NUTS

These are constituted by a first rider nut 48 provided with a thrust bearing 47 located on the nut by a retainer 45 and a second load transmitting nut 43 provided on its right-hand end with a thrust bearing 42. Both of the nuts 43 and 48 threadedly engage the screw-threaded portion of the spindle 1.

THE FIRST MEANS

A stop bracket 19 encircles the right-hand end of the pull-rod 23 and the angular relationship of the bracket 19 and the pull-rod 23 is preserved by a guide screw 22 set into the bracket 19 and extending into a key-way 15a cut in to the pull-rod 23.

Encircling the adjacent ends of the spindle 1 and the pull-rod 23 and acting as a housing for the protection of the various parts of the slack adjuster, is a third sensing member comprising a tubular casing 26 closed at each end by a front end plate 24 and a back end plate 49 respectively. The front end-plate 24, the external end face of which together with the adjacent face of the stop bracket 19 provides a clutch k—k which prevents rotation of the sensing member when these faces are engaged, is screwed into the casing 26 and locked by a set screw 25. A ring seal 18 is located in the end plate 24 between it and the pull-rod 23 and serves to prevent ingress of dirt into the casing 26 through that end thereof. The back end-plate 49 is screwed into the casing 26 and locked by a set-screw 2 and has on its left-hand face an axially extending boss to which is secured by one end (by pin 50) a protecting tube 51 having located in its other end a seal 52 which prevents the ingress of dirt into the interior of the casing 26 through the tube 51. The back end plate 49, where the spindle 1 passes through it, provides a bearing for the spindle 1 and, likewise, the front end-plate 24 provides by its internal axial extension, a bearing for the pull-rod 23.

This back end-plate 49 also provides (by face a) by engagement with a ring 3 carried by the nut 48, a clutch (of which the construction will be described in greater detail hereafter) a—a which when engaged prevents rotation of the nut 48.

The front end-plate 24 provides a seating for the right-hand end of main spring 16, the spring 16 encircling the pull-rod 23 and being engaged at its other end with the right-hand tapered end of a spring support 15 rotatable and axially slidable on the pull-rod 23. The left-hand face of the support 15 is toothed to provide with a similarly toothed abutting right-hand face of an end bush 29, a dog clutch h—h.

The end bush 29 is screwed into a housing 32 of the load transmititng mechanism, clamping in position between itself and the housing 32 a plate 13, and is secured in position by a set screw 30. The end bush 29 provides with the right-hand face of the load transmitting ring 14 normally released engageable stop faces g—g and the plate 13 provides with the left-hand end face of the load transmitting ring 14 a normally engaged dog clutch f—f.

Within the housing 32 is located a pre-compressed heavy spring 12 one end of which abuts the left-hand face of the plate 13 and the other end of which abuts an extension flange 33 of an element 36 to which it is screwed and secured by pin 34. In the release position (i.e. the position shown) of the slack adjuster, the flange 33 is forced to the left by the heavy spjring 12 into engagement with a thrust bearing 10 located between the flange 33 and the collar 8 on the pull-rod 23.

The left-hand end of the element 36 provides, with a ring 41 on the right-hand end of the nut 43 a clutch e—e of which the construction will be discussed in greater detail hereafter, and the left-hand extremity of the housing 32 provides with a face on the opposite end of the nut 43 another clutch d—d.

Encircling the element 36 towards the left-hand end thereof is an external retainer 39 abutted on its left-hand side by a washer 40 engaged by the right-hand end of a weak spring 5 which extends between the washer 40 and the thrust bearing 42 of the nut 43.

The right-hand side of the retainer 39 is engaged by a Belleville washer 6 which resiliently locates against a shoulder on the element 36 a coupling ring 7 having an inclined annular surface engaged by a series of balls 38 each located in an aperture in the housing 32 and all held into engagement with the inclined surface by a common encircling axially-split metallic ring 37. The coupling ring 7, the balls 38 and the split ring 37 having a construction and operation which will be desecribed in more detail hereafter.

THE SECOND MEANS

This second means (which it will be seen in the description hereafter of operation of the slack adjuster includes some parts which operate also as part of the first means) includes a stretch control tube 28 arranged between the tubular casing 26 and the housing 32. Secured to the right-hand end of the tube 28 is a bush 27 which provides a seating for the left-hand end of a stretch control return spring 17, the right-hand end of which bears against a shoulder on the inside of the front end-plate 24 of the sensing member. To the other end of the tube 28 is secured (by rivets 44 of which one only is shown) a guide bush 46 which slides in an annular recess between the back end-plate 49 and the tubular casing 26. The tube 28 is normally held by the stretch control spring 17 in the position shown in which a spacer 4, having a small degree of lost motion connection to the tube 28 by virtue of the right-hand flanged end of the spacer 4 being axially loosely accommodated in an annular internal recess in the tube 28, is located between the bearing 47 of the rider nut 48 and the other nut 43.

Figure 2:
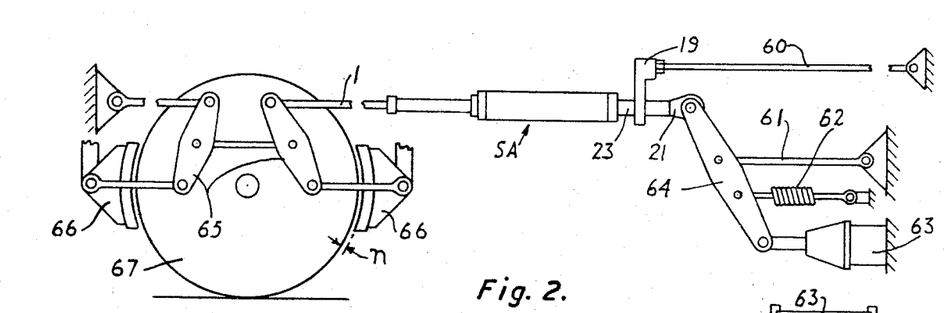
FIGS. 2–4 show in diagrammatic form various arrangements of brake rigging into which the slack adjuster of FIG. 1 or the slack adjusters of the following FIG. 5 can be fitted.
Figure 3:
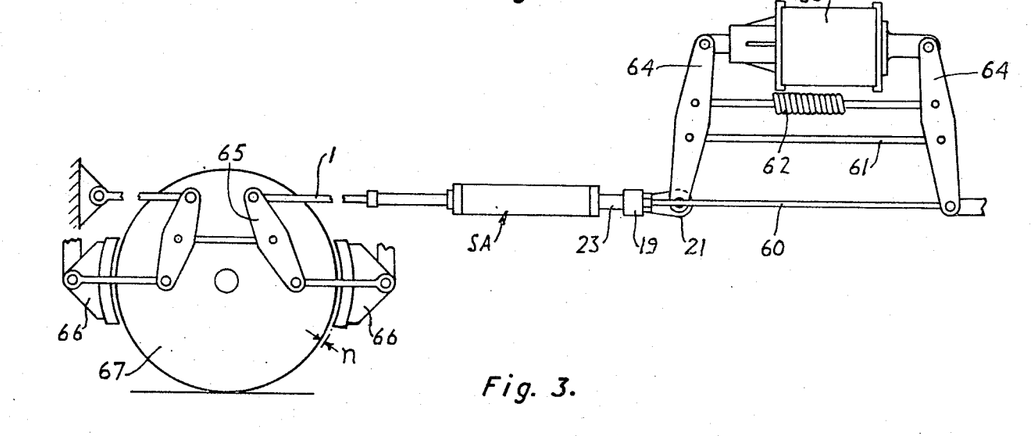
Figure 4:
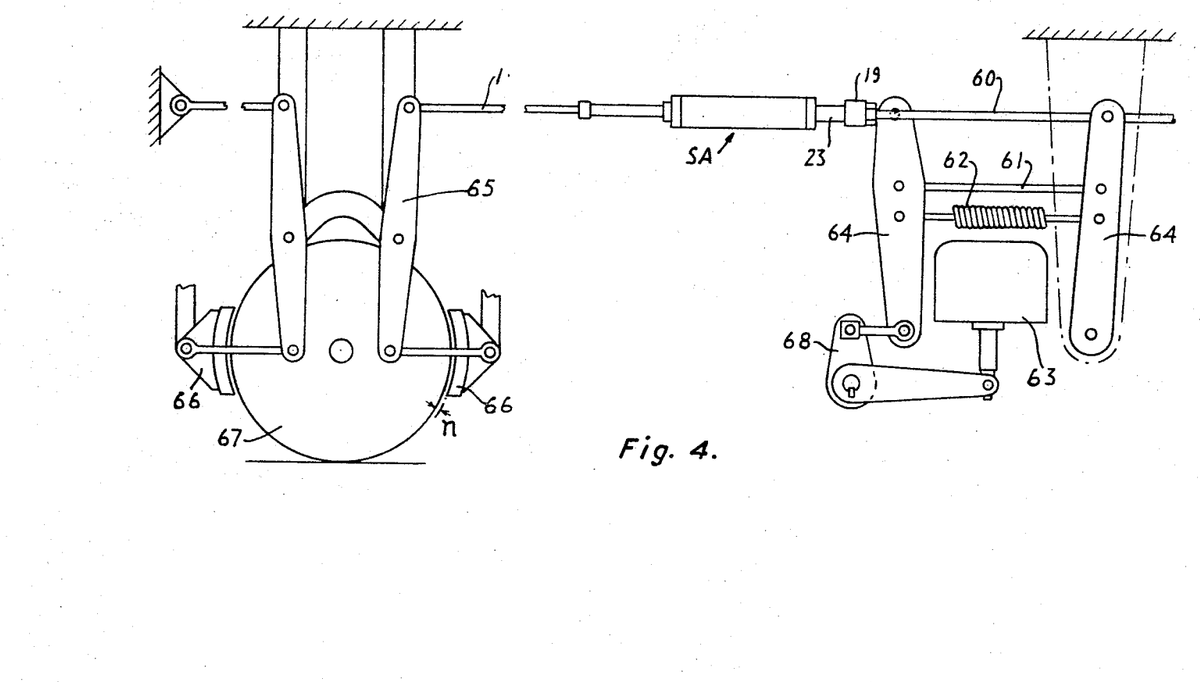

The slack adjuster above described can be fitted into any one of the alternative typical forms of brake rigging shown in FIGS. 2–4.

In the arrangement shown in FIG. 2, the brake rigging includes a brake cylinder 63 the piston rod of which is pivotally connected to one end of a lever 64 fulcrummed to a pivotally mounted rod 61. As is usual, a brake return spring 62 is also connected to the lever 64. The pull-rod 23 of the slack adjuster SA is pivotally connected by its cross-head 21 to the other end of the lever 64. The stop 19 is axially adjustably mounted on one end of a rod 60 pivotally mounted by its other end. The spindle 1 of the slack adjuster SA is pivotally connected to a lever system 65 connected to the brake blocks 66 arranged for braking of the wheel 67.

It will be seen that on energization of the brake cylinder 63 to extend its piston-rod, through lever 64 the slack adjuster SA and the lever system 65 will apply the brake blocks 66 to brake the wheel 67. Coversely, after a brake application, de-energization of the brake cylinder 63 permits release of the brake blocks 66 from the wheel 67 by the return spring 62.

FIGS. 3 and 4 illustrate a second type of brake rigging and in these figures, like references have been used for like parts in FIG. 2. It will be seen that in the arrangement of FIGS. 3 and 4, the single lever 64 of FIG. 1 is duplicated, the rod 61 and the return spring 62 in FIGS. 3 and 4 extending between the pair of levers 64 and pivotally connected to each other. In FIG. 3, the brake cylinder 63 also extends between the levers 64, the cylinder itself being connected to one lever 64 and the piston rod being connected to the other. In FIG. 4 the brake cylinder 63 acts only on one of the levers 64 through a crank 68.

In the arrangement of FIGS. 3 and 4, the cross-head 21 of the pull-rod 23 is pivotally connected to the end of one of the levers 64, remote from its connection to the brake cylinder 63 and the rod 60 carrying the stop 19 is connected to the end of the other lever 64 remote from its connection to the brake cylinder 63.

The rigging arrangements of FIG. 3 and 4, like that of FIG. 2 are well known in themselves and further description of the construction of the rigging and their mode of operation is believed to be unnecessary.

The slack adjuster SA is held in its normal position (i.e. with the brakes fully released) under the influence of the weight of the brake rigging and the rigging return spring 62. In this position, the face providing the clutch face k of the front end-plate 24 is spaced a distance N (FIGS. 1 to 4) from the opposed face k of the stop 19 irrespective of whether the actual brake clearance n of the brakes (see FIGS. 2–4) is normal or otherwise.

In this position of the slack adjuster the parts thereof have their positions as shown in FIG. 1. The sensing member comprising the casing 26 and end-plates 24 and 49 is held in position by the main spring 16. This spring 16 exerts a force to the right against the front-end plate 24 which force is transmitted through the tubular casing 26 to the back end-plate 49. The end-plate 49 is, therefore, urged to the right so that its clutch face *a* engages the ring 3 on the rider nut 48 to engage the clutch *a—a*. This clutch *a—a*, being engaged, the nut 48 is prevented from rotation and is, therefore, unable to spin to the right along the threaded portion of the spindle 1 without the casing 26, and end-plates 24 and 49 and spring 16 also spinning. The force exerted to the right on the rider nut 48 is transmitted through the spacer 4 to the load transmitting nut 43 to compress the light spring 5 and force the ring 41 of the nut 43 into abutment with the left-hand end of the bush 36 to maintain the prevention of rotation of nut 43 and to obviate telescoping of the two members spindle 1 and pull-rod 23. However, the spring 16 exerts also a force to the left on the spring support 15. This force retains engagement of the dog-clutch *h—h* between the support 15 and the end bush 29 of the housing 32 and through this dog-clutch *h—h* the force exerted by the spring 16 to the left is transmitted to the end bush 29 tending to disengage the clutch *f—f* between the ring 13 (which it will be remembered, is virtually solid with the end bush 29 being clamped between it and the housing 32 and the end bush 29) but as the housed spring 12 is much stronger than the main spring 16, the clutch *f—f* will be maintained engaged. Consequently, the load transmitting ring 14 being fixed to the non-rotatable pull-rod 23, ring 13, end bush 29, spring support 15, and therefore, the spring 16 are all prevented from rotating. As a result of this, neither can the end plate 24, the casing 26, the end plate 49, nor the nut 48, rotate.

In respect to the stretch control mechanism (the second means), the return spring 17 urges the stretch control tube 28 to the left so that the right-hand flanged end of the spacer 4 is abutted by the right-hand wall *c* of the internal annular recess in the tube 28.

The parts of the slack adjuster are, therefore, all retained in their positions shown in FIG. 1.

The operation of the slack adjuster in the three conditions of brake clearance (i.e. normal, excessive and inadequate) is as follows:

NORMAL BRAKE CLEARANCE

Brake application

Immediately a brake application commences by energization of the brake cylinder 63, the pull-rod 23 starts to move to the right. The pull-rod 23 carries with it the load transmitting ring 14 and the pull-rod collar 8 both of which are secured to the pull rod 23. Such movement of the pull-rod collar 8 disengages the clutch *e—e*. However, immediately after the disengagement of the clutch *e—e*, the clutch *d—d* engages thus continuing prevention or rotation of the load transmitting nut 43. This occurs by virtue of the fact that, at present, sufficient force is not exerted to compress the strong release spring 12 which, therefore, serves effectively to maintain the housing 32 solid with the pull-rod 23 by holding the plate 13 into engagement with the load transmitting ring 14 secured to the pull-rod 23.

As movement of the pull-rod 23 continues under the influence of movement of the piston rod of the brake cylinder 63, the spindle 1 will also be pulled to the right, transmission of movement occurring through the load transmitting ring 14, the stop plate 13 (held into engagement with the ring 14 by the strong release spring 12), the housing 32, clutch *d—d* and the load transmitting nut 43 which, being prevented from rotation by engagement of the clutch *d—d*, and, therefore, not free to spin down the spindle 1, pulls the spindle 1 with it.

Such movement of the various parts as above described, it will be observed, necessitates slight compression of the main spring 16 as the housing 32 (on which the spring 16 exerts a force to the left through the spring support 15 and the end bush 29) has to move against the spring 16 a small distance sufficient to disengage the clutch *e—e* and subsequently engage the clutch *d—d*; the spring 16 being unable to move bodily to the right with the housing 32 by virtue of its right-hand end being located by the front-end plate 24 which is prevented from movement, by the rider nut 48 being locked on the spindle 1 as above described.

However, should the resistance to movement of the rigging between the slack adjuster SA and the brake blocks 66 (FIGS. 2-4) be insufficient to compress the main spring 16 even to the extent required by the above sequence of operations, the spindle 1 will still be moved to the right by movement of the pull-rod 23. In this case, the force causing this movement will be transmitted through the load transmitting ring 14, the housing 32 (which, again, is effectively locked solid with the ring 14 by the release spring 12 through the stop plate 13) end bush 29, spring support collar 15, spring 16, front end-plate 24, tubular casing 26, back end-plate 49, clutch *a—a* and rider nut 48 which, being prevented from spinning to the right along the spindle 1 by engagement of the clutch *a—a*, pulls the spindle 1 with it. Such a condition will prevail until the resistance to movement of spindle 1 (eventually, if not before, at the instant of engagement of the brake blocks 66 with the wheel 67) increases to a valve sufficient to compress the main spring 16 an amount sufficient to disengage the clutch *e—e* preventing rotation of the load transmitting nut 43 and to engage the clutch *d—d* to prevent rotation of the nut 43.

Consequently, whichever of the above alternative operations occur, on the instant the brake blocks 66 engage the wheel 67, the nut 43 will be engaged through the clutch *d—d* with the housing 32.

In the case of normal clearance such engagement by the brake blocks 66 will occur at the instant when the clutch *k—k* between the front end plate 24 of the sensing member and the stop member 19 is engaged (the distance N corresponding to the distance *n*).

Once the brake blocks 66 engage the wheel 67, further movement of the brake cylinder rod will be resisted with an increasing force as pressure in the brake cylinder 63 increases. The force, which is transmitted through the pull-rod 23, load transmitting ring 14, stop plate 13, housing 32, clutch *d—d*, load transmitting nut 43 and spindle 1, will very soon increase to a value sufficient to compress the release spring 12; the right-hand end of spring 12 being held by the spindle 1 through the nut 43, the housing 32 and the stop plate 13, and the left-hand end tending to be moved to the right by the end bush 8 of the pull-rod 23, the thrust race 10 and the extension 33 of the coupling bush 36. It will be seen, therefore, that the pull-rod 23 will start to move to the right independently of the spindle 1 against the force exerted by the release spring 12.

Upon such movement of the pull-rod 23 occurring, by virtue of the load transmitting ring 14 being secured to it, the ring 14 will be moved to the right to disengage the clutch *f—f*. Disengagement of this clutch, as observed above, frees the mechanism of the slack adjuster for rotation (the whole of the slack adjuster, apart of course, from the stop bracket 19, now being supported by the nuts 43 and 48 and the thrust bearing 10) but rotation will not, in fact, occur by the engagement (as above described) of the clutch *k—k* between the front end-plate 24 and the stop bracket 19.

Upon continued movement of the pull-rod 23 (the total movement of the pull-rod 23 independent of the spindle 1 only being very small) the face *g* of the ring 14 will engage the face *g* of end bush 29 so that any increasing force which is now applied to the pull-rod 23 to increase the pressure exerted on the wheel 67 by the brake blocks 66 will bypass the release spring 12 being transmitted from the pull-rod 23 through the load transmitting ring 14, the engaged faces g—g, the end bush 29, the housing 32, clutch d—d and the load transmitting nut 43, to the spindle 1.

Meanwhile, during the compression of the spring 12, the coupling bush 36 (held fixed relative to the pull-rod 23 by the release spring 12) will have moved to the right relative to the housing 32 (held fixed relative to the spindle 1 by the nut 43). This relative movement of the bush 36, by virtue of the Belleville washer 6 located against a shoulder on the bush 36, carries with it the coupling ring 7 the annular inclined face of which is engaged by the balls 38. It will be seen, therefore, that the relative movement of the bush 36 to the housing 32 causes relative movement of the ring 7 to the balls 38. This latter movement, by virtue of the annular inclined surface on the ring 7, causes the balls 38 to be forced outwardly against the encircling split ring 37 which is thus radially expanded to engage the stretch control tube 28..

The stage has now been reached at which the brake blocks 66 having firmly engaged the wheel 67, any increase of force exerted by the brake cylinder 63 causes the brakes 66 to be applied with increasing effort. However, such increasing force by the brake cylinder is of such a value as to cause stretch of the brake rigging and, in order to avoid such stretching affecting the setting of the slack adjuster, it is desirable to provide means for permitting the slack adjuster to react to and compensate for this stretching without the setting of the slack adjuster being affected. The operation of the means provided for this eventuality will now be described.

It will be remembered that the slack adjuster parts are now in a position in which, (1) The front end-plate 24 abuts the stop bracket 19 so that any further movement to the right of the sensing member (i.e. casing 26 and end-plates 24 and 49) is prevented.

(2) The pull-rod 23 has moved to the right relative to the spindle 1 against the release spring 12 so that the face g of the ring 14 engages the face g of the end bush 29 of housing 32, and (3) The bush 36 has been moved to the right relative to the housing 32 so that the split ring 37 has been radially expanded to engage the stretch control tube 28.

As the rigging stretches, the pull-rod 23 and the spindle 1 will maintain their relationship (by transmission of load through the nut 43 locked by clutch d—d on spindle 1) but they will move together through the casing 26 to the right. Such movement of the spindle 1 tends to move the rider nut 48 to the right also thus disengaging the clutch a—a which holds it against rotation. It will be seen, therefore, that if the nut 48 was prevented from moving to the right with spindle 1, it would spin and the spindle 1 would be drawn through thereby altering the relative position of the two nuts 48 and 43 (it being remembered that the nut 43 is locked on the spindle 1) in a manner characteristic, as will be seen hereafter, of a slack adjustment operation.

However, to avoid such relative displacement and to preserve the relative positions of the two nuts 48 and 43 the following operations occur:

By the expansion of the split ring 37 to engage the stretch control tube 28, as the bush 36 moves to the right with the pull-rod 23 (it being effectively locked to the pull-rod 23 by the release spring 12) it will carry with it the stretch control tube 28 which is now locked to it by the expanding clutch comprised by the ring 7, the balls 38 and the spilt ring 37. As the tube 28 moves to the right it compresses the spring 17 (the spring 16 also being compressed through the load transmitting ring 14, the faces g—g, the bush 29 and the spring support 15) and carries with it the spacer 4 which by the flange thereof being picked up by the opposite face b of the internal annular recess in the tube 28. The tube 28 and spacer 4 will, of course, move at the same rate as the load transmitting nut 43, as they are all now effectively locked to the pull-rod 23 and spindle 1 and, therefore, the spacer 4 will be maintained engaged with the nut 43 as previously.

However, as explained above, the rider nut 48 is no longer locked on the spindle 1 and as the rider nut 48 will not be subjected to any restraining influence previously exerted on it by the spacer 4, the friction between the threads of the nut 48 and the screw-threaded portion of the spindle 1 will cause the nut 48 to follow closely the spacer 4.

It will be seen, therefore, that both the nuts 43 and 48 will travel to the right inside the casing 26 on the spindle 1 and that the relative relationship of the nuts 43 and 48 on the spindle 1 will be preserved, the nuts 43 and 48 continuing to be held the same distance apart, namely, a distance determined by the spacer 4.

Such movement of the various parts of the slack adjuster will continue all the time the rigging stretches, the relative spacing of the two nuts 43 and 48 always being preserved, until finally, the force exerted by the brake cylinder 63 reaches its maximum. The brake blocks 66 are now fully applied.

*Brake release*

The operations involved in brake release are merely the reverse of the operations above described for brake applications.

In the initial stage, reduction of the force exerted by the brake cylinder 63 permits the previously stretched brake rigging to recover. During this stage, the pull-rod 23 and the spindle 1 return to the left carrying with them the nuts 43 and 48 the relative positions of which on the spindle 1 will be maintained by the spacer 4 which is held in position relative to stretch control tube 28. The expanding clutch between the bush 36 and the tube 28 will be maintained engaged to return the tube 28 to the left. This return of the tube 28 is assisted by the stretch control return spring 17 which was compressed, as above described, during the application of the brake blocks 66. Likewise, return of the housing 32 to the left while positively effected by the engagement of the clutch g—g and the nut 43 being locked on the spindle 1, is assisted by the previously compressed spring 16.

Such movement continues until just before the brake blocks 66 are released from the wheel 67 when the condition will be reached when the clutch a—a between the rider nut 48 and the back end-plate 49 is once more engaged.

At this stage the rigging has completely regained its pre-stretched position.

Further reduction in the force exerted by the brake cylinder 63 now reduces the value of the force to that which can be overcome by the release spring 12. Consequently, the release spring 12 now stretches as the force exerted by the brake cylinder 63 continues to drop, so that the housing 32 moves to the right relative to the pull-rod 23. Such movement initially disengages the face g—g of the end bush 29 and the load transmitting ring 14 and the slack adjuster is free to rotate on the spindle 1 and the pull-rod 23. However, the clutch k—k between the front end-plate 24 and the stop bracket 19 is still engaged so such rotation is, in fact, prevented.

Immediately after the disengagement of the faces g—g the dog-clutch f—f is re-engaged thus locking once more the slack adjuster against rotation.

Meanwhile, by this movement of the housing 32, the relative movement between itself and the bush 36 has disengaged the expanding clutch from engagement with the stretch control tube 28 by permitting the split ring 37 radially to contract to move the balls 38 radially inwardly down the inclinded face of the ring 7.

At this point the brake blocks 66 are about to disengage the wheel 47 so continued movement of the piston rod of the brake cylinder 63 moves the pull-rod 23 and the spindle 1 to the left to disengage the brake blocks 66. During this movement, the sensing member (i.e. casing 26 and the end-plates 24 and 49) will be disengaged from the stop bracket 19 and be carried along with the spindle 1 and the pull-rod 23 by the rider nut 48 being locked to the spindle 1 because rotation of the nut 48 is prevented by the clutch $a$—$a$ being previously engaged as above described.

Due to the main spring 16 maintaining the parts in their respective positions, the slack adjuster therefore moves bodily to the left.

As explained with reference to the brake application, depending on the strength of the main spring 16 and the resistance of the rigging, either the return spring 62 of the brake rigging will act through the pull-rod 23, ring 14, plate 13 and bush 29, spring support 15, main spring 16, front end-plate 24, casing 26, back end-plate 49, rider nut 48 and spindle 1 to effect displacement of the brake blocks 66 from the wheel 67; or it will act through the pull-rod 23, pull-rod collar 8, bush 36, clutch $e$—$e$, load transmitting nut 43 and spindle 1.

Such movement will continue until the brake cylinder return spring 62 returns the piston rod of the brake cylinder 63 against its stop when the brake clearance will once again, be $n$ and the clearance between the front end-plate 24 and the stop bracket 19 will be N.

EXCESSIVE BRAKE CLEARANCE

In this circumstance, the clearance between the front end-plate 24 of the operating member and the stop bracket 19 will still be N but the clearance between the brake blocks 66 and the wheel 67 will be greater than $n$. The various parts of the slack adjuster will, of course, be as shown in FIGURE 1 as in the case of "normal" brake clearance.

*Brake application*

Upon the commencement of a brake application, the same operations occur as in the case of "normal" brake clearance, but, in this case, the stage will eventually be reached where, although the front end-plate 24 of the sensing member abuts the stop bracket 19 to engage the clutch $k$—$k$, due to the brake clearance being excessive, the brake blocks 66 will not yet have engaged the wheels 67.

From this position, continued brake application will not exert sufficient force to overcome and compress the release spring 12 as the spindle 1 will not resist continued movement to the left due to the brake blocks 66 not yet having engaged the wheel 67. Consequently, no relative movement will occur between the bush 36 and the housing 32 (as such relative movement is dependent upon the detection of the brake blocks 66 having engaged the wheels 67 by compression of the release spring 12), and the expanding clutch will not be operated to cause engagement of the split ring 37 with the stretch control tube 28.

However, the sensing member (the casing 26 and the end-plates 24 and 49) being prevented from rotation and axial movement to the right by engagement of the clutch $k$—$k$, the pull-rod 23 and the spindle 1 locked to it through the housing 32 and the load transmitting nut 43, will be pulled to the right through the casing 26 against the effort of the main spring 16 which will thus be compressed. As the stretch control tube 28 has not, at this stage, been picked up by the expanding clutch (split ring 37), it will remain in its position being held there by the return spring 17.

As the spindle 1 moves to the right (the force to the right on the back end-plate 49 exerted by the main spring 16 now being taken by the stop bracket 19 through the front end-plate 24), it will tend to carry with it the rider nut 48. However, the nut 48 is resiliently prevented from travelling with the spindle 1 by the spacer 4 acted upon by the return spring 17 of the tube 28 and the thrust bearing 47. Nevertheless, the tendency for the nut 48 to be moved to the right by movement of the spindle 1 is sufficient to relieve the pressure on the clutch $a$—$a$ and the nut 48 now being located axially only through the thrust bearing 47, it spins to permit the spindle 1 to be drawn through it.

The load transmitting nut 43, on the other hand, locked to the spindle 1 by the force required to move the brake rigging passing through the clutch $d$—$d$, travels with the spindle 1. It will be seen, therefore, that the spacing between the two nuts 43 and 48 now starts to increase and that the nut 48 will have been moved away from the spacer 4.

Such separation of the nuts 43 and 48 continues until the brake blocks 66 engage the wheel 67 whereupon further application of the brakes generates sufficient force to compress the release spring 12. Such compression of the spring 12, as above described in "Normal Brake Clearance" causes relative displacement of the bush 36 and the housing 32 to expand the expanding clutch to cause the tube 28 to be engaged by the split ring 37.

It will be seen, therefore, that at this point in the brake application, the separation of the nuts 43 and 48 will have increased and, furthermore, that this increase will be a measure of the amount by which the brake clearance was excessive.

From this point, the remainder of the brake application proceeds as in the case of "normal" clearance. That is to say the brake rigging will stretch as the brakes are applied with increasing pressure but this stretch will not affect the relative position of the nuts 43 and 48 on the spindle 1 as the stretch control tube 28 has been engaged by expansion of the expanding clutch by means of which the tube 28 will be carried along with the spindle 1 and pull-rod 23 against the effort of the return spring 17. Such movement of the tube 28 carries with it the spacer 4 which permits the rider nut 48 to be carried to the right by the spindle 1.

The braking pressure can, therefore, now be increased to the maximum without disturbing the relative positions of the nuts 43 and 48 on the spindle 1.

*Brake release*

In the initial stage of the brake release (i.e. during the recovery of the stretched rigging), the operation of the parts is the reverse of that of the parts during the brake application and is as described for this stage in "Normal Brake Clearance."

The state will, therefore, be reached where (the rigging having totally recovered from its stretching and the brakes 66 about to disengage from the wheel 67) the release spring 12 will have disengaged the expanding clutch from the tube 28, which will have returned to its initial position; the clutch $d$—$d$ will still be engaged to lock the load transmitting nut 43 on the spindle 1; and the rider nut 48 will abut the back end-plate 49 to cause engagement of the clutch $a$—$a$. However, the nuts 43 and 48 will still be separated by the increased distance so that, in particular, the load transmitting nut 43 will still be disengaged from the spacer 4. It should here be noted that, of course, the distance between the nut 43 and the spacer 4 will equal the increase in the distance between the two nuts 43 and 48 previously made by movement of the spindle 1 through the nut 43 and, as observed above, will correspond to the amount by which the brake clearance was excessive.

From this position, as the pull-rod 23 moves to the left under the influence of the brake return spring 62, the housing 32 will be carried by the pull-rod 23 being locked to it by the release spring 12 holding the dog-clutch $f$—$f$ engaged.

The nut 43 is also urged to the left by the support spring 5 acting on the nut 43 through the thrust bearing 42, so that the housing 32 moves to the left thus relieving the clutch $d$—$d$; the nut 43 is caused to "chase" the housing 32 by spinning along the spindle 1 to the left. Such movement continues until the nut 43 is stopped from further movement by engaging the spacer 4. When this occurs, continued movement to the left of the pull-rod 23 causes the face e of the pull-rod end bush 36 to engage the ring 41 of the nut 43 to engage the clutch e—e and prevent further rotation of the nut 43.

Meanwhile, of course, the spring 16 which was compressed, as above described, during the displacement of the rider nut 48 on the spindle 1 has been regaining its initial condition but serving to retain the front end-plate 24 on the sensing member engaged with the stop bracket 19. This being so, the spindle 1 has not been moved to the right as it has been locked with the casing 26 by the clutch a—a being engaged to prevent the rider nut 48 being rotated.

Consequently, the position has now been reached in which the brake blocks 66 are still engaged with the wheels 67 (spindle 1 having been prevented from moving since the brake rigging stretch was fully recovered); the front end plate 24 of the sensing member still engages the stop bracket 19; and the various parts of the slack adjuster are all in their position shown in FIGURE 1.

Continued release of the brakes 66, therefore, exactly in the manner described in "Normal Brake Clearance," moves back the pull-rod 23 and the spindle 1 (locked to it by the nut 43 through the clutch e—e) to the left carrying bodily with it the slack adjuster until, when the brake cylinder piston engages its stop, the clearance between the front end-plate 24 and the stop bracket 19 will, once again, be N and the brake clearance will have been restored to n.

INADEQUATE BRAKE CLEARANCE

In this circumstance, the clearance between the front end-plate 24 of the sensing member and the stop bracket 19 will still be N but the clearance between the brake blocks 66 and the wheel 67 will be less than n. The various parts of the slack adjuster will, of course, be as shown in FIGURE 1 as in the case of "normal" brake clearance.

*Brake application*

Upon the commencement of a brake application, the same operations again occur as in the case of "normal" brake clearance, but, in this case, the stage will eventually be reached where, although the brake blocks 66 engage the wheel 67, due to the brake clearance being less than normal, the front end-plate 24 of the sensing member will not yet have abutted the stop bracket 19 to engage the clutch k—k; the clearance still existing between the plate 24 and the bracket 19 being a measure of the amount by which the brake clearance is inadequate.

As explained in "Normal Brake Clearance," upon engagement of the brake blocks 66 with the wheel 67 subsequent increase of force exerted by the brake cylinder 63 to apply the brake blocks 66 with greater force causes the release spring 12 to be compressed to disengage the dog-clutch f—f between the plate 13 secured to the housing 32 and the load transmitting ring 14. In "normal" brake clearance, it will be remembered, the clutch g—g was engaged shortly afterwards because the slack adjuster was prevented from moving axially or rotating by the front end-plate 24 engaging the stop bracket 19 to engage the clutch k—k.

However, because the brake clearance is here inadequate, the slack adjuster is not so restrained. Consequently, the clutch f—f being broken, the housing 32 is urged to the right by the compressed release spring 12. However, the housing 32 being engaged through clutch d—d (engaged when the brake blocks 66 engaged the wheel 67) with the load transmitting nut 43, the housing 32 can only move to the right by spinning on the bearing 10. The housing 32 thus spins because the clutch f—f is broken and the clutch g—g has not yet engaged and it "chases" the load transmitting ring 14 carried by the pull-rod 23 as it is moved to the right by the brake cylinder.

When the housing 32 spins it carries with it the remainder of the internal parts of the slack adjuster not secured to the pull-rod 23 as the main spring 16 rotatably holds the casing 26 (through the clutch h—h) coupled to the housing 32 and the casing 26, through the back end-plate 49 and clutch a—a, spins the rider nut 48 along the spindle.

It will be seen, therefore, that the sensing member (casing 26 and end-plates 24 and 49), the housing 32, bush 36, the stretch control mechanism and the nuts 43 and 48 all preserve their axial position on the pull-rod 23 as it moves to the right while the spindle 1 remains static.

Such movement of these parts continues until the sensing member (and the pull-rod 23) have travelled independently of spindle 1 a distance to the right corresponding to the amount by which the brake clearance was inadequate, i.e. until the end-plate 24 engages the stop bracket 19. When this occurs further spinning of the casing 26 (and, therefore, the housing 32 by virtue of the main spring 16) is prevented and on further continued movement of the pull-rod 23 the faces g—g are engaged.

The slack adjuster is now in the same condition as immediately prior to rigging stretch in "Normal Brake Clearance," that is to say, the sensing member abuts the stop bracket 19 to engage the clutch k—k and the brake blocks 66 are engaged with the wheel 67, so that any further movement of the pull-rod 23 and spindle 1 arising from stretch of the rigging causes operation of the second means in exactly the same manner as in "Normal Brake Clearance." Consequently further energisation of the brake cylinder 63 causes the brake blocks 66 to be applied with increasing effort to the wheel 67 up to the maximum.

*Brake release*

This is identical to the "Normal Brake Clearance" release, so that it will be seen that, at the end of brake release, the clearance between the front end-plate 24 of the sensing member and the stop bracket 19 will again be N and the brake clearance between the brake blocks 66 and the wheel 67 will have been restored to n.

MANUAL ADJUSTMENT

In the event of, for example, new brake blocks being fitted, it may be necessary manually to adjust the clearance to approximately the normal, leaving it to subsequent brake application to effect precise adjustment of the clearance.

This manual adjustment is achieved in the slack adjuster of FIGURE 1 by inserting a tommy bar or like tool into recesses in the front end-plate 24 and rotating the casing 26. Rotation of the casing is permitted, in this event, by the rotational force being applied through the spring 16 to the spring support 15 of which the clutch h—h with the end bush 29 is such that it "gives up" under the torque applied.

Rotation, in this manner, of the casing 26 causes the nut 48 to be rotated (through the clutch a—a) to tend to feed the spindle 1 to the left. Such movement of the spindle 1 (assisted, if necessary, by externally pulling the spindle 1) tends to move the load transmitting nut 43 to the left. This action relieves the clutch e—e and permits the nut 43 to spin so that the spindle 1 can pass through it.

ICE OR OTHER ARTIFICIAL RESISTANCE

If there should be ice between the brake blocks 66 and the wheel 67 or the rigging is corroded, the slack adjuster release spring 12 may falsely detect the "brake-engaged" condition. In this event, the following operations occur:

*Brake application*

At some time during the brake application, but before the brake blocks 66 actually engage the wheel 67, the resistance to movement of the spindle 1 will rise to a value such that the force generated by the brake cylinder 63 will overcome and compress the release spring 12. The front end-plate 24 not, by then, having engaged the stop bracket 19, the slack adjuster will be operated in a manner as if inadequate clearance had been detected, that is to say, spinning to the right will occur paying out the spindle 1 relative to the pull-rod 23, until the end-plate 24 engages the stop bracket 19. Indeed, if the artificial resistance is sufficiently high, the rigging will start to stretch and the stretch control tube 28 will be engaged by the split ring 37 to effect operation of the second means to preserve the relative positions of the nuts 43 and 48 on the spindle 1 in the above described manner.

However, the stage will eventually be reached at which the force exerted by the brake cylinder 63 is sufficient to overcome the artificial resistance.

When this occurs the resistance to movement of the spindle 1 and pull-rod 23 suddenly drops to a much lower value and the previously compressed springs 12 and 16 both restore themselves to their respective initial condition.

Spring 12 by its extension releases the expanding clutch so that the tube 28 is no longer engaged and held by the split ring 37 and on such release is rapidly returned by the return spring 17 taking the rider nut 48 back into engagement with the back end-plate 49.

However, the relative positions of the front end-plate 24 to the stop bracket 19 (i.e. in engagement therewith) and the brake blocks 66 to the wheel 67 (i.e. not in engagement therewith) is characteristic of excessive brake clearance, the excessiveness of which is equal to the correction wrongly made for inadequate clearance due to the artificial resistance. Consequently correction is now automatically made for the excessive clearance in the manner above described.

The slack adjuster of FIGURE 5 while having the same main groups of components differs from the slack adjuster of FIGURE 1 in some details of construction and, also, in the mode of some of its operational functions and these differences only will now be described.

THE FIRST AND SECOND MEMBERS

The construction and arrangement of the spindle 1 and the pull-rod 23 are generally similar to the equivalent parts of the slack adjuster of FIG. 1, but in this case the load-transmitting ring 14 is constituted by a sleeve axially slidable on the pull-rod 23.

THE PAIR OF NUTS

These differ only in that, for reasons which will become apparent hereafter, the load transmitting nut 43 is provided not only with the thrust bearing 42 on its right-hand end but is provided with a second thrust bearing 42a located on the left-hand end of the nut 43 and secured by a retainer 42b.

THE FIRST MEANS

Figure 5:
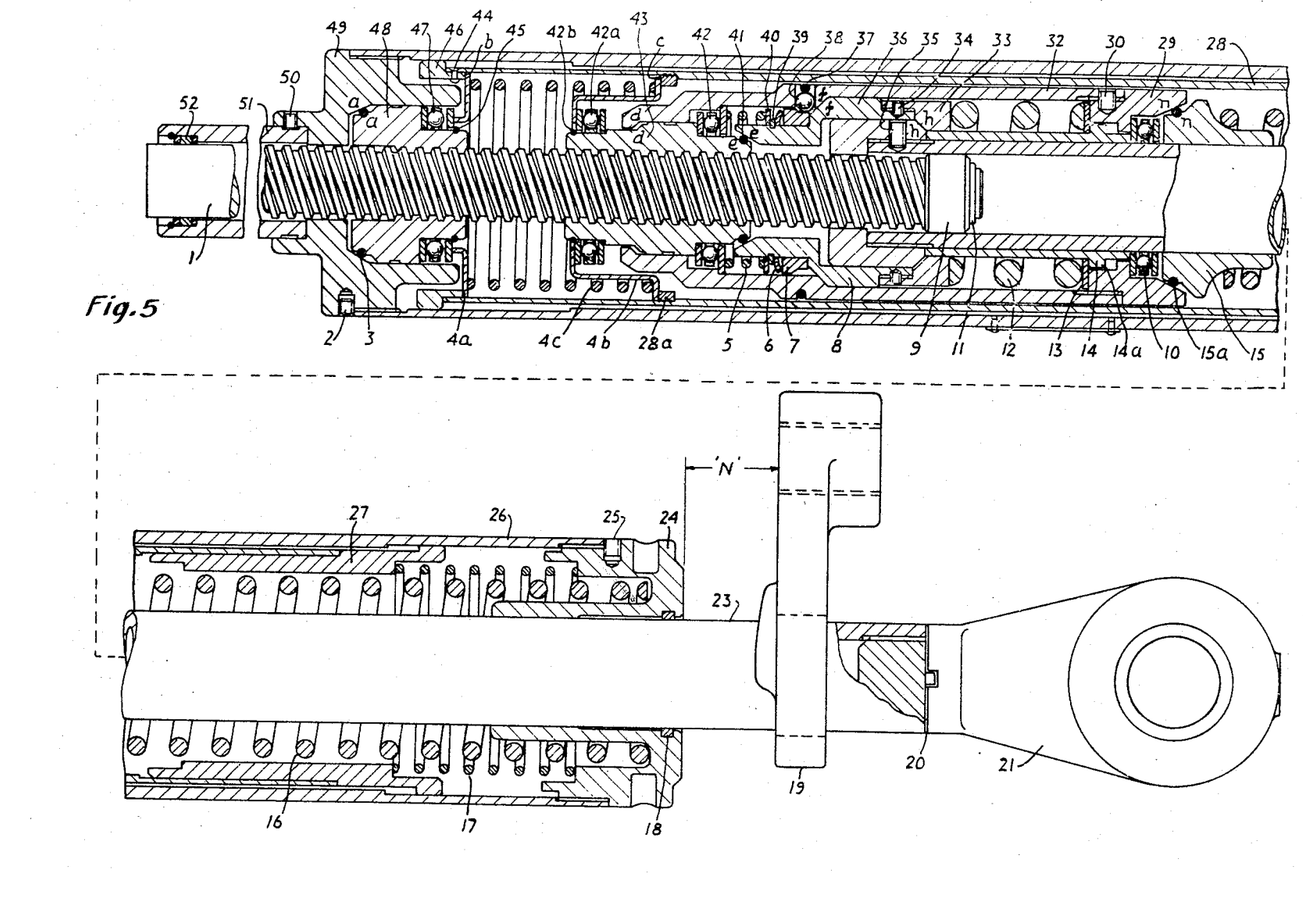
FIG. 5 shows a longitudinal cross-sectional view of a second form of automatic double-acting slack adjuster.

In the slack adjuster of FIG. 5, the stop bracket 19 merely provides, in operation, an abutment for the front end-plate 24 and the adjacent faces of these two parts do not constitute a clutch as they do in the slack adjuster of FIG. 1. Indeed, rotation between the end-plate 24 and the stop bracket 19 is essential in this case. Consequently, the preservation of the angular relationship of the stop bracket 19 and the pull-rod 23 is not of such great importance and the key-way 15a and the guide screw 22 have been dispensed with.

The tubular casing 26 and the two end-plates 24 and 49 are substantially identical to the equivalent parts of the slack adjuster of FIG. 1 but their function is somewhat different (as will be seen hereafter) and in this embodiment they constitute what may be termed as "an operating member" rather than, as in FIG. 1, merely a "sensing member."

The spring support 15, in this case does not provide the clutch h—h which slips in manual adjustment (this clutch, in the slack adjuster of FIG. 5, being provided between the extension flange 33 of the element 36 and the right-hand end of the collar 8 on the pull-rod 23) but by means of a ring 15a carried on the left-hand end of the spring support 15, it does provide a clutch n—n with the right-hand inclined end-face of the end bush 29 of the housing 32.

The plate 13 clamped between the end-bush 29 and the housing 32 while still providing a support for the right-hand end of the heavy spring 12 does not, in this case, provide part of the clutch f—f (now constituted by two complementary inclined faces one carried by the housing 32 and the other by the element 36). However, it does provide an abutment for an annular protrusion 14a on the load transmitting sleeve 14.

The thrust bearing 10 is, in the slack adjuster of FIG. 5, located between the end bush 29 and the spring support 15 so that, unlike the slack adjuster of FIG. 1, the heavy spring 12 forces the flange 33 to left so that, through the element 36, the clutch f—f is engaged in the release position of the slack adjuster. The spring 12, it will be seen therefore, is housed in the housing 32 between the flange 33 and the plate 13 and exerts no pressure on the clutch h—h which is maintained engaged solely by the effort of the main spring 16. In this case, the thrust bearing 10 is axially slidable on the pull-rod 23 and can be moved to the right into engagement with the spring support 15 if the load transmitting sleeve 14 is moved to the right.

THE SECOND MEANS

In the slack adjuster of FIG. 5, the spacer 4 of FIG. 1 is replaced by two abutment washers 4a and 4b of which the former engages the thrust bearing 47 of the rider nut 48 and a shoulder b provided by the guide bush 46, and the latter engages the thrust bearing 42a of the load transmitting nut 43 and a shoulder c provided by a collar 28a secured internally in the stretch control tube 28. The two abutment washers 4a and 4b are resiliently retained in their respective positions by a separating spring 4c.

Like the slack adjuster of FIG. 1, the slack adjuster of FIG. 5 may be fitted in exactly the same manner into the rigging of any one of FIGS. 2–4 and the positions of its constitutional parts in the release position of the brakes are as shown in FIG. 5.

The operation of the slack adjuster in the three conditions of brake clearance (i.e. normal, excessive and inadequate) is as follows:

NORMAL BRAKE CLEARANCE

Brake application

The initial stage of the brake application is substantially identical to that with the slack adjuster of FIG. 1. That is to say, movement of the pull-rod 23 to the right under the influence of the brake cylinder 63 carries with it the spindle 1 either because of force transmission from the pull-rod 23 through the end bush 8, the clutch h—h, element 36, clutch f—f (maintained engaged by the heavy spring 12), housing 32, clutch d—d and load transmitting nut 43, to the spindle 1 or because of force transmission from the pull-rod 23 through the end bush 8, clutch h—h, element 36, clutch f—f, housing 32, end bush 29, clutch n—n, spring support 15, main spring 16, end-plate 24, casing 26, end-plate 49, clutch a—a, and rider nut 48, to spindle 1.

In either case, as before, the stage will again be reached when, the brake blocks 66 having engaged the wheels 67, the clutch e—e will be broken, the clutch d—d will be engaged, and the end-plate 24 will engage the stop bracket 19.

Continued energization of the brake cylinder 63 will apply the brake blocks 66 with increasing force to a stage sufficient to compress the spring 12 which (as in the slack adjuster of FIG. 1) causes, by expansion of the clutch constituted by the balls 38 and the split ring 37, the second means to become effective to, by the abutment washers 4a and 4b, preserve the position of the nuts 43 and 48 on the spindle 1 as it and the pull-rod 23 are drawn through the casing 26 as the rigging stretches.

Brake release

Again, as the rigging regains its pre-stretched condition, the nuts 43 and 48 will be returned to their initial positions, and thereafter, as the brake blocks 66 are released from the wheels 67, the condition will be restored in which the brake block clearance is n and the clearance between the end-plate 24 and the stop bracket 19 is N.

Excessive brake clearance

Again, the operations of brake application and release are generally similar as to the equivalent operations of the slack adjuster of FIG. 1 in that, during the brake application, the distance between the two nuts 43 and 48 is increased by an amount corresponding to that by which the brake clearance is excessive (the rider nut 48 spinning in its position adjacent the endplate 49 while the nut 43 is carried to the right on the spindle 1) and, during the brake release, the load transmitting nut 43 spins to the left along the spindle 1 until the distance between the two nuts 43 and 48 is once again restored to normal when the nut 43 engages its abutment washer 4b.

INADEQUATE BRAKE CLEARANCE

It is in this operation that the slack adjuster of FIG. 5 differs most markedly from the slack adjuster of FIG. 1.

1st brake application

The stage will eventually be reached in which, due to the inadequate brake clearance, the brake blocks 66 will have engaged the wheel 67 but the end-plate 24 will still be spaced from the stop bracket 19.

After such occurrence, continued energization of the brake cylinder 63 causes sufficient force to be generated that the heavy spring 12 is compressed. When this occurs, the clutch f—f is broken as the element 36 is moved to the right by the end bush 8 on the pull-rod 23. Further, as end bush 8 abuts the load-transmitting sleeve 14, it moves this also to the right relative to the housing 32 and, before the expanding clutch comprised by the balls 38 and the ring 37 can pick up the stretch control tube 28, the load transmitting sleeve 14 pushes the thrust bearing 10 against the spring support 15 to break the clutch n—n. The operating member (casing 26 and end-plates 24 and 49) is now supported on the rider nut 48 (through end-plate 49) and the thrust bearing 10 (thorugh end-plate 24, main spring 16 and spring support 15) and it therefore spins to the right over the spindle 1 and the pull-rod 23 compressing the separating spring 4c as the rider nut 48 moves towards the load transmitting nut 43. As the casing 26 spins to the right it will carry with it, inter alia, the stretch control tube 28. Movement to the right of the stretch control tube 28 causes the previously supporting face c of the collar 28a to be displaced from the abutment washer 4b so that the force exerted to the right by the separating spring 4c will be taken solely by the load transmitting nut 43 through its thrust bearing 42a but, of course, this force is not by any means sufficient to overcome the loading on the nut 43 through the clutch d—d so this clutch will remain engaged to prevent spinning of the load transmitting nut 43. It will be here noted that this operation differs from the comparable operation of the slack adjuster of FIG. 1 in that, in this case, it is only the nut 48 which spins to the right (the nut 43 being maintained in position by its spinning being prevented by the clutch d—d maintained engaged by the heavy spring 12) whereas, before, both the nuts 43 and 48 spun to the right with the casing 26. Consequently, in this case, there is at this stage no "paying out" of the spindle 1 and the pull-rod 23 relative to each other.

Such spinning movement of the casing 26 will continue until the casing 26 abuts the stop bracket 19 whereupon the casing 26 will be relieved of the force exerted by the main spring 16 which will now be exerted on the stop bracket 19. It should here be noted that the axial distance travelled by the casing 26 during its movement is a measure of the amount by which the brake clearance was inadequate. So also, will be the reduction of the distance between the two nuts 43 and 48 be such a measure.

At this stage, as in the other operations, continued energization of the brake cylinder 63 causes stretch of the rigging which, as before, causes engagement of the ring 37 with the stretch control tube 28 and subsequent movement of this tube 28 to preserve the positions of the nuts 43 and 48 on the spindle 1 as it and the pull-rod 23 move to the right through the casing 26.

1st brake release

As in all other operations, as the brake rigging recovers its pre-stretched condition, the nuts 43 and 48 will be returned to their pre-stretching position in which the rider nut 48 engages through clutch a—a the end plate 49.

On continued release of the brakes the various parts of the slack adjuster will maintain their relative positions. In particular, the rider nut 48 will abut through the clutch a—a the end plate 49, the load transmitting nut 43 will be closer to the nut 49 by an amount corresponding to that by which the brake clearance was inadequate, the clutch e—e now being engaged by the force exerted on the nut 43 by the compressed separator spring 4c and the abutment washer 4b will be spaced from the face c of the collar 28a by a distance also corresponding to the amount by which the brake clearance was inadequate.

At the end of the brake release, it will be seen that the brake clearance is still of the same inadequacy but the distance N between the end-plate 24 and the stop bracket 19 will be reduced by an amount (also corresponding to the amount of the inadequacy) due to the nut 48 having been moved towards the nut 43.

2nd brake application

In the initial stage of the brake application, the pull-rod 23 (in the usual manner) will be moved to the right. Normally, this would cause the clutch e—e to be broken and the clutch d—d immediately thereafter to be engaged. However, it will be remembered that this time the nut 43 is subjected to the force exerted by the compressed separator spring 4c through the thrust bearing 42a. Consequently, as the pull-rod 23 moves to the right although the clutch e—e will be relieved the clutch d—d will not immediately be engaged because the nut 43 will "chase" the pull-rod 23 under the influence of the spring 4c, the nut spinning to the right along the spindle 1 supported by the thrust bearing 42a, thus "paying-out" the spindle 1 relative to the pull-rod 23.

Such movement will occur until the abutment washer 4b engages the face c of the collar 28a when the nut 43 will be relieved of the force exerted by the spring 4c so that the clutch d—d can engage. At this point, the condition of the slack adjuster will be as that in an intermediate position of a "Normal Clearance" brake application; i.e. the brake clearance is less than normal, the clearance N is less than normal by a corresponding amount, and the two nuts 43 and 48 are spaced a normal distance apart. Consequently, the brake application (and subsequent release) continue as for "Normal Brake Clearance."

Manual adjustment

This is achieved, as in the slack adjuster of FIG. 1 by rotating the casing 26. Such rotation (through end-plate 24, main spring 16, spring support 15, clutch n—n, end bush 29, housing 32, clutch f—f, element 36, and flange extension 33) causes the clutch h—h to give up. Rotation of these parts causes the rider nut 48 to be rotated (through end-plate 49 and clutch a—a) and also the nut 43 to be rotated (through housing 32 and clutch d—d, or through element 36 and clutch e—e, depending on the direction of rotation) to "pay out" or "take in" the spindle 1 as the case may be.

ICE OR OTHER ARTIFICIAL RESISTANCE

As in the slack adjuster of FIG. 1, the presence of an artificial resistance is detected as inadequate clearance, that is to say, the resistance causes the operating member to spin to the right over the spindle 1 and the pull-rod 23 to shorten the distance between the two nuts 43 and 48. However, in this case, once the resistance is broken, the spindle 1 and pull-rod 23 (whose relative positions will be maintained by the clutch d—d remaining engaged) will be pulled through the operating member. Such movement will tend to carry with the spindle 1, the rider nut 48. However, this nut 48 will be supported by the compressed spring 4c through thrust bearing 47 so that, whilst the nut 47 will spin (due to the clutch a—a being relieved by the tendency for the nut 48 to be carried to the right by spindle 1), it will not, in fact, travel with the spindle 1 and the original relationship of the end nuts 43 and 48 will be restored.

The two forms of clutches mentioned hereinbefore and which are both of general application, will now be described in greater detail.

Figure 6:
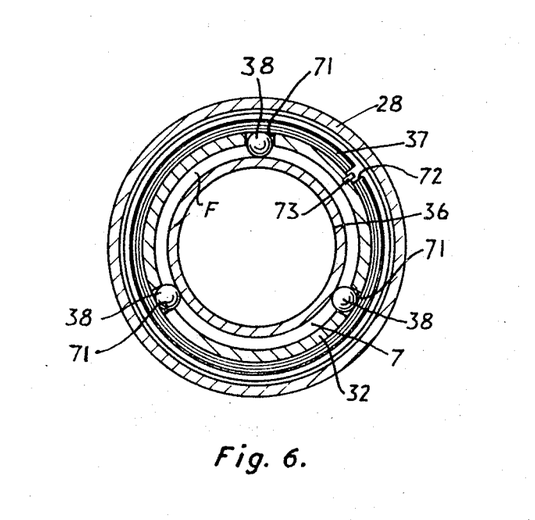
FIG. 6 shows a longitudinal cross-sectional view of the clutches used in the slack adjusters of FIGS. 1–5.

In FIG. 6 is shown a transverse cross-sectional view of the expanding clutch and in both of the slack adjusters above described.

The clutch comprises a first part (the element 36) and a second part (the stretch control tube 28) between which the clutch is effective. Mounted on the first part and located thereon by the spherical spring washer 6, is a ring 7 provided with an annular face F inclined with respect to the axis of the ring 7. Arranged around this face F are three equidistantly spaced balls 38 each of which is located circumferentially relative to the ring 7 in an aperture 71 (FIG. 6) in a member (housing 32) surrounding the ring 7.

The balls 38 are resiliently urged into engagement with the surface F by a resilient ring 37 lying between the balls 38 and the second part (tube 28). In the embodiment shown, the resilient ring 37 is of metal and resilience is imparted to it by its being split axially at 72 (FIG. 6). A peg 73 secured to the member (housing 32) and projecting into the split at 72 serves to prevent rotation of the split ring 37.

It will be seen that axial movement of the first part (element 36) relative to the member (housing 32) and, therefore, relative to the second part (tube 28), causes the ring 7 to be moved axially relative to the balls 38. The balls 38 are, therefore, forced radially outwardly relative to the ring 7 against the resilient effort of the split ring 37 which is thereby expanded to grip the second part (tube 28) to bring it into driven relationship with the first part (element 36) upon continued axial movement thereof.

While in the above described embodiment, the clutch is engaged by expansion of the split ring 37, in other contexts the clutch could be arranged to be engaged by contraction of the ring 37. In this case, the above mentioned second part (tube 28) would carry internally the annular face F engaged by the balls 38 and the split ring 37 (then arranged for contraction) would be internally of the face F between it and the first part (element 36). By this arrangement, axial movement of the second part (tube 28) would cause, by face F, the balls 38 to be moved radially inwardly relative to the second part against the resilience of the split ring 37 so that the ring 37 was radially contracted to grip the first part (element 36).

Figure 7:
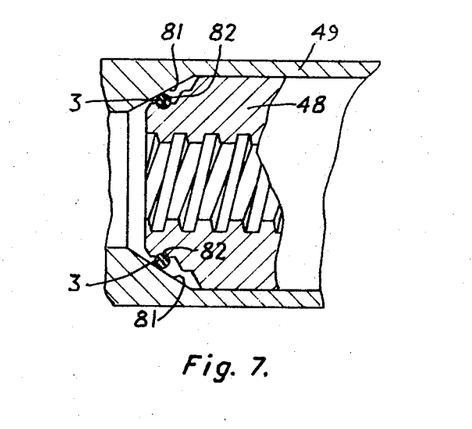
FIGURE 7 is an expanded view showing a portion of FIGURES 1 and 5.

In FIG. 7 is shown, on an enlarged scale, the form of clutch used at a—a, e—e and n—n in the above described slack adjusters, and this type of clutch is illustrated with reference to the clutch a—a of those slack adjusters.

The clutch comprises a first rotational part (endplate 49) provided with an internal frustro-conical clutch face 81. Co-axially arranged within the first part is a second part (nut 48) having at one end a concentric annular groove 82 in which is located a split metal ring 3. It will be seen that, assuming the clutch is disengaged (i.e. that the ring 3 is not engaged with the face 81), the clutch can be engaged by axial movement of one of the parts relative to the other to bring the two parts into the same rotational relationship (i.e. if one of the parts was rotationally driven, then the other will be caused to rotate likewise; as if one of the parts is braked rotationally, then the other of the parts would likewise be braked). It will also be seen that the greater the axial force urging the two parts together, the greater will be the rotational coupling of the two parts.

Whilst a ring 3 is constituted by a split metal ring, any other suitable form of ring may be used.

Again, although it is the inner part (nut 48) which is provided with the ring 3 and it is the outer part (endplate 49) which is provided with the frustro-conical face 81, in other contexts the relative position of the face 81 and the ring 3 may be reversed. That is to say, the outer part may have an internal annular groove in which is located the ring 3, the inner part then having an exterior frustro-conical face.

Having thus described our invention what we claim is:

1. An automatic slack adjuster for use in brake rigging between power cylinder means and brake blocks and wherein said rigging includes a stop, said slack adjuster comprising a first member having a screw-threaded portion, a second member telescopically movable relative to said first member, said first and second members being connected to one of said power cylinder means and brake blocks, first and second nuts threadedly engaging said screw threaded portion of said first member, a sensing member, normally spaced from and movable towards said stop, and means operatively connected with said nuts and including a strong spring compressible in operation of the slack adjuster only by a force of the magnitude transmitted through the slack adjuster by relative movement of said first and second members during actual braking for moving said sensing member with said second member toward said stop for permitting axial displacement by spinning of said nuts together on the first member to "pay out" said members relative to each other in response to compression of said strong spring before engagement of said sensing member with said stop, and for preventing said "pay out" upon engagement of said sensing member with said stop.

2. An automatic slack adjuster according to claim 1 wherein said first member is a spindle having a bush on the inner end thereof and said second member is a tubular pull rod having said bush therein, said pull rod having a collar at the end thereof of an internal diameter less than the diameter of said bush.

3. An automatic slack adjuster according to claim 1 wherein the sensing member constitutes a casing which houses the internal parts of the slack adjuster and through which at each end extend the first and second members respectively.

4. An automatic slack adjuster according to claim 1 wherein the stop encircles the second member and is engageable by an adjacent end of the sensing member.

5. An automatic slack adjuster according to claim 1 and further including means operatively connected with said two nuts for preserving the relative positions of the two nuts as the brake rigging stretches during brake application.

6. An automatic slack adjuster according to claim 5 and further including means connected with said preserving means for actuating said preserving means upon compression of said strong spring when the sensing member engages the stop.

7. An automatic slack adjuster according to claim 6 wherein said last mentioned means includes a stretch control element which abuts the first nut and clutch means by which the element can be brought into driven connection with the second nut to bring the said means into operation.

8. An automatic slack adjuster according to claim 7 wherein the clutch means comprises an inclined surface carried by the second member, and a series of elements in engagement with the inclined surface and moveable up the inclined surface to bring the stretch control element into driven connection with the second nut.

9. An automatic slack adjuster according to claim 8 wherein the stretch control element is tubular, the inclined surface is annular and concentric within the stretch control element and said series of elements are arranged around said surface and all held in engagement therewith by a common encircling axially split ring which, upon the series elements being moved up the inclined surface, is expanded thereby to engage the stretch control element.

10. An automatic slack adjuster according to claim 7 wherein the stretch control element is resiliently loaded into abutment with the first nut by a second spring extending between the stretch control element and the sensing member.

11. An automatic slack adjuster according to claim 7 wherein the stretch control element abuts the first nut through the medium of a rotary bearing.

12. An automatic slack adjuster according to claim 7 wherein the stretch control element carries spacing means extending between the two nuts.

13. An automatic slack adjuster according to claim 12 wherein the spacing means is rigid.

14. An automatic slack adjuster according to claim 1 wherein said means comprises clutch means, urged into engagement by one end of said strong spring and separable upon compression thereof, for preventing said two nuts from spinning, said clutch means comprising two clutch faces and being operatively connected between a said nut and a said member.

15. An automatic slack adjuster according to claim 14 wherein one of the clutch faces is on a part abutted by one end of the strong spring and the other of the clutch faces is carried by the second member.

16. An automatic slack adjuster according to claim 15 wherein the part has a second clutch face, a corresponding clutch face on the second nut engageable with said second clutch face on said part, whereby engagement of these two clutch faces prevents relative rotation of the part and the second nut.

17. An automatic slack adjuster according to claim 16 wherein there is provided a bush axially located on the second member by abutment of the bush by the other end of the strong spring, the bush having a clutch face, a second clutch face on the second nut engageable with the clutch face of said bush, whereby engagement of these two clutch faces prevents relative rotation of the second nut and the bush.

18. An automatic slack adjuster according to claim 17 wherein spring means resiliently urge the second nut in a direction to disengage the clutch face on the bush and the second clutch face on the second nut.

19. An automatic slack adjuster according to claim 17 wherein one end of said spring means bears against said bush and the other end abuts a rotary bearing located between it and the second nut.

20. An automatic slack adjuster according to claim 15 wherein the part constitutes a housing surrounding the second nut and the strong spring.

21. An automatic slack adjuster according to claim 9 wherein a housing surrounds the second nut, the strong spring, and a bush, and wherein the clutch means is extended between the bush and the stretch control element, the clutch means passing through the housing.

22. An automatic slack adjuster according to claim 21 wherein the clutch means comprise a series of elements located one in each of a series of apertures in the housing.

23. An automatic slack adjuster according to claim 15 wherein a spring weaker than said strong spring resiliently urges said part in a direction to disengage the clutch faces urged into engagement by the strong spring, the force urging the part in the disengaging direction being insufficient to overcome the force exerted in the engaging direction by the strong spring.

24. An automatic slack adjuster according to claim 23 wherein the weaker spring has one end abutting the sensing member.

25. An automatic slack adjuster according to claim 15 wherein the other of the clutch faces urged into engagement by the strong spring is on a ring secured to the second member.

26. An automatic slack adjuster according to claim 23 wherein there is provided one on each of the ring and the part two further clutch faces the clutch faces on said ring being mutually closer than the two clutch faces on said part whereby the two further clutch faces are engaged after the first mentioned clutch faces have been disengaged upon compression of the strong spring.

27. An automatic slack adjuster according to claim 15 wherein there is provided co-operating rotary clutch faces one on each of the sensing member and the stop.

28. An automatic slack adjuster according to claim 24 wherein there is a spring support rotatably mounted on the second member, the spring support having a clutch face resiliently urged by the weaker spring abutting the spring support into engagement with a co-operating clutch face on the part.

29. An automatic slack adjuster according to claim 1 wherein there is provided a clutch face on the first nut and a corresponding clutch face on the sensing member.

30. An automatic slack adjuster according to claim 29 wherein one of the engageable clutch faces provided one on the first nut and the other on the sensing member is conical and the other is provided with a ring co-axial with the conical face.

31. An automatic slack adjuster according to claim 17 wherein one of the engageable clutch faces provided one on the second nut and the other on the bush is conical and the other is provided with a ring co-axial with the conical face.

32. An automatic slack adjuster according to claim 1 wherein means is provided for manually operating the slack adjuster.

33. An automatic slack adjuster according to claim 32 wherein the means for manually operating the slack adjuster comprises a rotary clutch resiliently held engaged and which can be overcome by manual rotation of the sensing member.

34. An automatic slack adjuster as set forth in claim 28 wherein means are provided for manually operating the slack adjuster comprising said sensing member and said two last mentioned clutch faces.

35. An automatic slack adjuster for use in brake rigging connected between a motor and brake blocks engageable with a wheel comprising first and second members movable telescopically relative to each other to effect slack adjustment, said first and second members each being connected to one of said motor and brake blocks the first member having a screw-threaded portion, first and second nuts threadedly engaging said screw-threaded portion and displaceable thereon to effect relative telescoping of the two members, first means operatively connected to at least one of said nuts for detecting any excess of brake clearance over the normal and for effecting displacement of the two nuts on the screw-threaded portion to restore the clearance to normal, and second means including means operatively engageable with said nuts for preserving a substantially constant spacing between the nuts on the screw-threaded member during the stage of brake application which occurs after the brake block has engaged the wheel and elastic stretching of said brake rigging has commenced.

36. An automatic slack adjuster for use in brake rigging connected between a motor and brake blocks engageable with a wheel comprising first and second members movable telescopically relative to each other to effect slack adjustment, said first and second members each being connected to one of said motor and brake blocks, the first member having a screw-threaded portion, first and second nuts threadedly engaging said screw-threaded portion and displeacable thereon to effect relative telescoping of the two members, first means operatively connected to one of said motor and brake blocks for detecting any departure of brake clearance from normal and for effecting displacement of the two nuts on the screw-threaded portion to restore the clearance to normal, and second means including means operatively engageable with said nuts for preserving a substantially constant spacing between the nuts on the screw-threaded member during the stage of brake application which occurs after the brake block has engaged the wheel and elastic stretching of said brake rigging has commenced.

37. An automatic slack adjuster as claimed in claim 36 wherein the first means includes a spring urged element for detecting engagement of the brake blocks with the wheel, and means responsive to detection of normal brake clearance upon brake application by said first means for actuating said second means.

38. An automatic slack adjuster as claimed in claim 37 wherein said second means comprises a tube encircling said element and said last-mentioned means comprises an expanding clutch located between the element and said second means and engageable with said tube and element to effect driving engagement therebetween.

39. An automatic slack adjuster as claimed in claim 38 wherein the expanding clutch comprises an annular inclined surface carried by the element, a series of balls on said surface, a resilient ring between the balls and the tube and urging said balls against said surface, whereby axial movement of the element relative to the tube moves the inclined surface relative to the balls to move the balls against the resilient force of the ring to bring the ring by radial movement thereof into engagement with the tube to clutch the element and the tube together.

40. An automatic slack adjuster as claimed in claim 39 wherein the ring is an axially split metal ring.

41. An automatic slack adjuster as claimed in claim 37 and spring means for resisting movement of the element and the tube during occurrence of stretch.

42. An automatic slack adjuster as claimed in claim 41 wherein separate spring means are provided for the element and for the tube.

43. An automatic slack adjuster as claimed in claim 37 and a stop member, said first means including third means engageable with said stop member following actuation of the brake motor for initiating operation of the slack adjuster to effect a reduction or increase of slack as may be required to restore the clearance to normal.

44. An automatic slack adjuster as claimed in claim 43 wherein the third means comprises a housing of the components of the slack adjuster.

45. An automatic slack adjuster as claimed in claim 43 wherein the third means comprises a clutch face and the first nut has a clutch face engaged therewith in the release position of the slack adjuster to prevent rotation of the first nut and which when disengaged permits rotation of the first nut.

46. An automatic slack adjuster as claimed in claim 37 wherein the element and the second nut have engageable clutch faces which are engaged in the release position of the slack adjuster to prevent rotation of the second nut and which when released permit rotation of the nut, and means for disengaging said clutch faces during the initial stage of a brake application including said first and second members.

47. An automatic slack adjuster as claimed in claim 46 wherein the first means also comprises a further element having a clutch face, said second nut on the side thereof remote from said clutch face thereon having a second clutch face engageable with the clutch face of said further element, and means for engaging said second set of clutch faces immediately after the release of said first set of clutch faces upon initiation of a brake application prior to engagement of the brake blocks with the wheels.

48. An automatic slack adjuster as claimed in claim 47 wherein said further element comprises means for locating elements of said actuating means whereby relative axial movement of the first element and said further element actuates said actuating means.

49. An automatic slack adjuster as claimed in claim 47 and a spring between the first element and the second nut urging the second nut in a direction to engage the second set of clutch faces to release the first set of clutch faces, the strength of the spring being insufficient, in operation of the slack adjuster, to overcome the force exerted by the first mentioned spring urging the first element and the weight of the rigging which retains the slack adjuster in its release position.

50. An automatic slack adjuster as claimed in claim 49 and a thrust bearing between said spring and said second nut.

51. An automatic slack adjuster as claimed in claim 47 wherein the spring urging the first mentioned element lies between said second member and said further element.

52. An automatic slack adjuster as claimed in claim 51 wherein said further element is of tubular construction and encompasses the second nut, said further element having spaced opposed clutch faces, said second member having a pair of spaced, opposed clutch faces between and closer spaced than said opposed clutch faces of said further element whereby upon relative movement of said further element and said second member disengagement and engagement, respectively of said clutch faces will occur.

References Cited

UNITED STATES PATENTS 2,767,811   10/1956   Browall et al. _________ 188—196

DUANE A. REGER, *Primary Examiner.*